(12) United States Patent
Ito et al.

(10) Patent No.: US 8,066,091 B2
(45) Date of Patent: Nov. 29, 2011

(54) STEERING SYSTEM

(75) Inventors: Takahiro Ito, Hitachinaka (JP); Atsushi Yokoyama, Tokyo (JP); Mitsuo Sasaki, Hadano (JP)

(73) Assignee: Hitachi, Ltd., Tokyo (JP)

( * ) Notice: Subject to any disclaimer, the term of this patent is extended or adjusted under 35 U.S.C. 154(b) by 376 days.

(21) Appl. No.: 11/870,956

(22) Filed: Oct. 11, 2007

(65) Prior Publication Data

US 2009/0038876 A1 Feb. 12, 2009

(30) Foreign Application Priority Data

Oct. 13, 2006 (JP) ................. 2006-279401

(51) Int. Cl.
*B62D 5/06* (2006.01)
(52) U.S. Cl. .................. 180/403; 180/406; 180/422
(58) Field of Classification Search .................. 180/421, 180/422, 402, 403, 406
See application file for complete search history.

(56) References Cited

U.S. PATENT DOCUMENTS

| 6,336,519 B1 * | 1/2002 | Bohner et al. ............ 180/403 |
| 6,502,661 B1 * | 1/2003 | Heitzer .................... 180/403 |

FOREIGN PATENT DOCUMENTS

| DE | 103 44 662 A1 | 5/2005 |
| GB | 2 341 588 A | 3/2000 |
| GB | 2 346 044 A | 6/2000 |
| JP | 2000-211641 A | 8/2000 |
| JP | 2001-122140 A | 5/2001 |
| JP | 2003-261055 A | 9/2003 |
| JP | 2003-276617 A | 10/2003 |
| JP | 2005-82007 A | 3/2005 |
| WO | WO 96/01759 A1 | 1/1996 |

OTHER PUBLICATIONS

European Search Report dated Dec. 17, 2009 (Five (5) pages).
Japanese Office Action with English Translation dated Jul. 14, 2011 (six (6) pages).

* cited by examiner

*Primary Examiner* — Anne Marie Boehler
(74) *Attorney, Agent, or Firm* — Crowell & Moring LLP (57) ABSTRACT

A steering system, comprising: an input cylinder having a first hydraulic chamber and a second hydraulic chamber; a transmission mechanism, wherein a transmission efficiency for converting and transmitting a linear motion of the input cylinder to a rotary motion of a steering wheel is less than a transmission efficiency for converting and transmitting the rotary motion of the steering wheel to the linear motion of the input cylinder; an output cylinder connected to a steerable vehicle wheel and having a third hydraulic chamber and a fourth hydraulic chamber; a first hydraulic passage for connecting the first hydraulic chamber to the third hydraulic chamber; a second hydraulic passage for connecting the second hydraulic chamber to the fourth hydraulic chamber; a flow rate control mechanism for exchanging hydraulic oil with: a first hydraulic circuit including the first and third hydraulic chambers and the first hydraulic passage; and a second hydraulic circuit including the second and fourth hydraulic chambers and the second hydraulic passage, in order to adjust a ratio of hydraulic oil quantities in the first and second hydraulic circuits; a steering actuator for providing the steerable vehicle wheel with a steering power assistance; and a controller for cooperatively controlling the flow rate control mechanism and the steering actuator.

9 Claims, 8 Drawing Sheets

STEERING SYSTEM

CLAIM OF PRIORITY

The present application claims priority from Japanese application serial No. 2006-279401, filed on Oct. 13, 2006, the content of which is hereby incorporated by reference into this application.

BACKGROUND OF THE INVENTION

1. Field of the Invention

The present invention relates to vehicle steering system for setting the ratio of the steered angle of a wheel tire relative to the steering angle of a steering wheel depending on a driving situation without causing any sensation of discomfort to a driver.

2. Prior Art

Conventionally, a technology called steer-by-wire is known which connects a steering wheel to a steerable vehicle wheel via electric signals and utilizes an electric control for improving performance and for securing mountability into vehicles or vehicle cabin space. However, such a device lacks reliability against an electric failure, etc. and has difficulty in transferring a reaction force of a road surface applied to a steering wheel by means of motors; therefore, has not yet been put to practical use. As an alternative vehicle steering system which is functionally equivalent to the above system and therefore can continuously vary the ratio of the steered vehicle wheel angle relative to the steering angle of a steering wheel, a system using mechanical gears is disclosed in Japanese Patent Application Laid-open No. 2000-211541 and is practically used. This type of steering system has a high power steering actuator and are provided with a variable ratio transmission mechanism using gears and motors somewhere in a steering column, in which the motors are controlled to adjust the output/input ratio, and the steering actuator is cooperatively controlled to set the ratio of the steered angle of a steerable vehicle wheel relative to the steering angle of a steering wheel depending on a driving situation. This system still use a steering column, thus reliability is secured and there is no need of virtually creating any reactive torque.

Japanese Unexamined Patent Application Publication No. 2003-276617, etc. disclose a steering system which uses a cable instead of a steering column for securing layout flexibility. This steering system uses a flexible cable for connecting a steering wheel to a rack. Thereby, flexibility in space and layout can be secured. Further, a steering system in known in which a variable steering angle ratio mechanism is combined with such a system as described above to enable the setting of the ratio of the steered angle of a steerable vehicle wheel relative to the steering angle of a steering wheel depending on a driving situation.

Japanese Patent Application Laid-open No. 2001-122140 discloses a steering system in which a steering wheel is connected to a steerable vehicle wheel via a hydraulic line, and pumps and valves are used to realize a variable steering transmission ratio mechanism. Japanese Patent Application Laid-open No. 2005-082007 also discloses a steering wheel which uses hydraulic lines for connection to realize a variable steering transmission ratio mechanism. These systems secure flexibility in space and layout similarly to the above-mentioned systems using cables.

Patent Document 1: Japanese Patent Application Laid-open No. 2000-211541
Patent Document 2: Japanese Patent Application Laid-open No. 2003-276617
Patent Document 3: Japanese Patent Application Laid-open No. 2001-122140
Patent Document 4: Japanese Patent Application Laid-open No. 2005-82007

SUMMARY OF THE INVENTION

Although the technology described in the above-mentioned Japanese Patent Application Laid-open No. 2000-211541, etc. can freely control the steered angle of a steerable vehicle wheel in response to the steering angle of a steering wheel, it still uses a steering column and therefore cannot solve current typical problems of vehicles such as mountability and preservation of vehicle cabin space. In addition, it has a structure which connects the steering wheel to the variable transmission ratio mechanism via the gears and steering column; thus, vibration or the like caused by the operation of the variable transmission ratio mechanism is likely to be transferred to the driver, which is difficult to suppress by design or control measures.

Although the technology described in the above-mentioned Japanese Patent Application Laid-open No. 2003-276617, etc. can secure mountability and vehicle cabin space, the cable is expected to be difficult to handle because the bending and tension of the cable must be taken into consideration. Additionally, for a reason similar to the above case, the steering system using cables has difficulty in controlling the steering without causing any discomfort to a driver.

The technology described in the above-mentioned Japanese Patent Application Laid-open No. 2001-122140 uses the pumps for varying the steering transmission ratio, so there are hydraulic oil transfers between hydraulic circuits. However, the management of oil supply to each hydraulic circuit is difficult, and therefore it is difficult to control the steering without causing any sensation of discomfort to a driver. To overcome this problem, valves for throttling hydraulic passages are required so as not to exert a force caused by the operation of the variable steering transmission ratio mechanism on the steering wheel. There are also required some sort of measures against the hydraulic pulsation produced by the pumps.

In the technology described in the above-mentioned Japanese Patent Application Laid-open No. 2005-82007, the variable steering transmission ratio mechanism and input shaft of the steering wheel are provided on the same axis and connected with each other via a ball screw mechanism similarly to the above-mentioned system using a steering column; so, vibration or the like caused by the operation of the variable steering transmission ratio mechanism is directly transferred to the steering wheel, causing a sensation of discomfort to a driver.

Accordingly, the object of the present invention is to provide a steering system, in which the set of the ratio of the steered angle of the wheel tire to the steering angle of the steering wheel can be changed depending on the driving situation without causing any sensation of discomfort to the driver.

In order to solve the above problems, a steering system of the present invention includes: an input cylinder having a first hydraulic chamber and a second hydraulic chamber; a transmission mechanism, wherein a transmission efficiency for converting and transmitting a linear motion of the input cylinder to a rotary motion of a steering wheel is less than a transmission efficiency for converting and transmitting a rotary motion of the steering wheel to a linear motion of the input cylinder; an output cylinder connected to a steerable vehicle wheel and having a third hydraulic chamber and a fourth hydraulic chamber; a first hydraulic passage for connecting the first hydraulic chamber to the third hydraulic chamber; a second hydraulic passage for connecting the second hydraulic chamber to the fourth hydraulic chamber; an flow rate control mechanism for exchanging hydraulic oil with: a first hydraulic circuit including the first and third hydraulic chambers and the first hydraulic passage; and a second hydraulic circuit including the second and fourth hydraulic chambers and the second hydraulic passage, in order to adjust the ratio of hydraulic oil quantities in the first and second hydraulic circuits; a steering actuator for providing the steerable vehicle wheel with a steering power assistance; and a controller for cooperatively controlling the flow rate control mechanism and steering actuator.

With this configuration, the steering wheel is connected to the steerable vehicle wheel via substantially leak-free hydraulic oil cylinders and hydraulic lines rather than a steering column. In this steering system, the flow rate control mechanism can be cooperatively controlled with the steering actuator to set the ratio of the steered angle of the steerable vehicle wheel relative to the steering angle of the steering wheel depending on the driving situation, thus realizing a variable steering transmission ratio mechanism. The use of the hydraulic lines enables layout flexibility, and, in addition to this, no column shaft need be used, thus realizing both better mountability and preservation of sufficient vehicle cabin space. Additionally, the parts are connected to each other via hydraulic circuits, and, as a result, vibration caused by the operation of the flow rate control mechanism or steering actuator is less likely to propagate to the steering wheel, thus providing improved steering feel. Further, there is no need to consider the bending and the like of hydraulic lines, unlike cables, thus providing ease of handling. In addition, the steering actuator can be easily and cooperatively controlled by using the flow rate control mechanism for exchanging hydraulic oil with each hydraulic passage, thus realizing the variable steering transmission ratio mechanism which dose not cause any sensation of discomfort to the driver. Further, the transmission mechanism is configured such that the transmission efficiency for converting axial motion of the piston in the input cylinder to rotary motion of the steering wheel is less than that for converting the rotary motion of the steering wheel to the linear motion of the piston. As a result, a force caused by the operation of the flow rate control mechanism is prevented from being transferred to the steering wheel; therefore, the driver has no sensation of discomfort, and no additional valve or the like is required.

Moreover, the flow rate control mechanism also functions as an flow rate varying mechanism for varying: the ratio of hydraulic oil quantities flowing in and out of the first and third hydraulic chambers; and the ratio of hydraulic oil quantities flowing in and out of the second and fourth hydraulic chambers.

It is preferable that the steering system further includes an failure detection system for detecting an operational abnormality of the steering actuator.

With this configuration, if it is detected that the steering actuator fails due to an electrical fault or the like and the operation cannot be continued any longer, the steering actuator is controlled so as not to disturb the transmission of steering power through the first and second hydraulic circuits.

It is also preferable that when the failure detection system detects an operation abnormality, the flow rate control mechanism provides the steerable vehicle wheel with a steering power assistance by controlling the hydraulic pressure of the output cylinder.

This can minimize the burden of the driver even when the steering actuator fails to operate.

It is also preferable that the flow rate control mechanism includes: a cylinder tube; a piston for defining, in the cylinder tube, a fifth hydraulic chamber connected to the first hydraulic circuit and a sixth hydraulic chamber connected to the second hydraulic circuit; an electric motor; and a conversion gear for converting a rotary motion of the electric motor to an axial motion of the piston, the conversion gear having irreversibility for suppressing power transmission from the piston to the electric motor.

With this configuration of the flow rate control mechanism, the first and second hydraulic circuits can be operated completely independently of each other, thus facilitating the management of the hydraulic oil quantity of each part by using the piston operation, which in turn facilitates the cooperative control between the flow rate control mechanism and steering actuator. Further, this configuration can prevent the motor from unintentionally counter rotating by a pressure applied to the piston of the flow rate control mechanism.

It is also preferable that when there occurs a displacement of correspondence between the neutral position of the steering wheel and that of the steerable vehicle wheel, the flow rate control mechanism cooperates with the steering actuator to correct the displacement of correspondence.

It is also preferable that the steering system further includes: a steering angle sensor for detecting the steering angle of the steering wheel; and a steered angle sensor for detecting the steered angle of the steerable vehicle wheel, in which the flow rate control mechanism corrects the displacement of correspondence between the neutral positions based on the sensor outputs of the steering angle sensor and the steered angle sensor.

With this configuration, any slight displacement of correspondence between the neutral positions caused by a minor amount of oil leakage or the like can be detected and corrected without causing any sensation of discomfort to the driver.

It is also preferable that the steering actuator includes: a power cylinder connected to the steerable vehicle wheel and having a pair of hydraulic chambers; and a reversible pump reversibly driven by an electric motor for selectively supplying the power cylinder with a hydraulic pressure.

Preferably, the output cylinder and the power cylinder are disposed parallel to each other.

With this configuration, even when the vehicle width is not sufficiently wide and the output cylinder and power cylinder cannot be disposed in series, the steering system of the present invention can be mounted within the vehicle.

It is also preferable that the steering system further includes: a reservoir tank; a first connecting passage for connecting the first hydraulic circuit to the reservoir tank; a first one-way valve provided in the first connecting passage for permitting only an oil flow from the reservoir tank to the first hydraulic circuit; a second connecting passage for connecting the second hydraulic circuit to the reservoir tank; and a second one-way valve provided in the second connecting passage for permitting only an oil flow from the reservoir tank to the second hydraulic circuit.

With this configuration, any minor hydraulic oil leakage from the first or second hydraulic circuit can be replenished.

It is also preferable that the steering system further includes: a hydraulic pressure sensor for detecting the hydraulic pressures of the first and second hydraulic chambers respectively, wherein the controller controls the steering actuator based on the sensor output of the hydraulic pressure sensor.

This configuration can detect the steering power delivered by a driver without the need of providing the steerable vehicle wheel or other places with an additional torque sensor or the like.

It is also preferable that the failure detection system detects abnormalities of the first and second hydraulic circuits based on the sensor output of the hydraulic pressure sensor.

It is also preferable that the transmission mechanism is configured such that the greater the pressure of the first or second hydraulic chamber, the lower the transmission efficiency from the input cylinder to the steering wheel.

When the steering actuator fails and the flow rate control mechanism provides a steering power assistance, this configuration prevents the steering wheel from unintentionally turning by an excessively great reaction force resulting from a pressure increase in the input cylinder, and therefore the driver's operation is not disturbed.

An alternative steering system of the present invention includes: an input cylinder having a first hydraulic chamber and a second hydraulic chamber; a transmission mechanism, wherein a transmission efficiency for converting and transmitting a linear motion of the input cylinder to a rotary motion of a steering wheel is less than a transmission efficiency for converting and transmitting a rotary motion of the steering wheel to a linear motion of the input cylinder; an output cylinder connected to a steerable vehicle wheel and having a third hydraulic chamber and a fourth hydraulic chamber; a first hydraulic passage for connecting the first hydraulic chamber to the third hydraulic chamber; a second hydraulic passage for connecting the second hydraulic chamber to the fourth hydraulic chamber; a steering actuator for providing the steerable vehicle wheel with a steering power assistance; and a correction mechanism for exchanging hydraulic oil with: a first hydraulic circuit including the first and third hydraulic chambers and the first hydraulic passage; and a second hydraulic circuit including the second and fourth hydraulic chambers and the second hydraulic passage, in order to compensate a change in an actuating amount of the steering actuator in response to a steering amount of the steering wheel.

Preferably, the correction mechanism is controlled and operated depending on the actuating amount of the steering actuator.

With this configuration, when the steering actuator is controlled to increase or decrease the steering amount irrespective of the driver's wish, the correction mechanism is controlled such that no change occurs in the oil quantity flowing into the input cylinder chamber on the side of the steering wheel.

This prevents any operation of the steering actuator from being transferred to the steering wheel, thus causing no sensation of discomfort to the driver.

It is also preferable that when there occurs a displacement of correspondence between the neutral position of the steering wheel and that of the steerable vehicle wheel, the correction mechanism corrects the displacement of correspondence.

An another alternative steering system of the present invention include: an input cylinder having a first hydraulic chamber and a second hydraulic chamber; a ball screw mechanism for converting and transmitting a rotary motion of a steering wheel to an axial motion of the input cylinder; an output cylinder connected to a steerable vehicle wheel and having a third hydraulic chamber and a fourth hydraulic chamber; a first hydraulic passage for connecting the first hydraulic chamber to the third hydraulic chamber; a second hydraulic passage for connecting the second hydraulic chamber to the fourth hydraulic chamber; an flow rate control mechanism which includes a fifth hydraulic chamber connected to a first hydraulic circuit including the first and third hydraulic chambers and the first hydraulic passage, and a sixth hydraulic chamber connected to a second hydraulic circuit including the second and fourth hydraulic chambers and the second hydraulic passage, the flow rate control mechanism adjusting the ratio of hydraulic oil quantities of the first and second hydraulic circuits by adjusting the volume ratio of the fifth and sixth hydraulic chambers; a steering actuator for providing the steerable vehicle wheel with a steering power assistance; and a controller for cooperatively controlling the flow rate control mechanism and steering actuator.

With this configuration, a rotary motion of the steering wheel is converted to an axial motion of the input cylinder, and a hydraulic pressure is transferred to the output cylinder via the first and second hydraulic circuits to steer the steerable vehicle wheel. Further, the first and second hydraulic circuits can be operated completely independently of each other because a cylinder is used for configuring the flow rate control mechanism connected to the first and second hydraulic circuits, thus facilitating the management of the hydraulic oil quantity of each part by using the operation of the flow rate control mechanism, which in turn facilitates the cooperative control with the steering actuator. For a similar reason, the force caused by the operation of the flow rate control mechanism can be readily controlled so that it is prevented from being transferred to the steering wheel, and thus no valve or the like is required.

It is preferable that the flow rate control mechanism and steering actuator are disposed adjacent to each other.

This can improve mountability.

It is also preferable that the steering system further includes: a second input cylinder having a pair of hydraulic chambers and connected to the ball screw mechanism; a second output cylinder connected to the steerable vehicle wheel and having a pair of hydraulic chambers; and seventh and eighth hydraulic chambers respectively connected to third and fourth hydraulic circuits each for connecting one of the pair of hydraulic chambers of the second input cylinder to the corresponding one of the pair of hydraulic chambers of the second output cylinder, the flow rate control mechanism adjusting the volume ratio of the fifth and sixth hydraulic chambers and the volume ratio of the seventh and eighth hydraulic chambers.

This configuration can connect the steering wheel to the steerable vehicle wheel via dual hydraulic circuits, thereby securing high reliability.

It is also preferable that the steering system further includes: a first balancing hydraulic passage for connecting the first hydraulic circuit to the third hydraulic circuit; a first free piston provided in the first balancing hydraulic passage; a second balancing hydraulic passage for connecting the second hydraulic circuit to the fourth hydraulic circuit; and a second free piston provided in the second balancing hydraulic passage.

In the dual hydraulic circuits capable of securing reliability, this configuration can adjust the oil quantities in the two hydraulic circuits for transferring the same force in the same direction, when they cannot transfer the same force, for example, due to a minor amount of hydraulic oil leakage, thereby the forces transferred by the two hydraulic circuits can be equalized.

It is also preferable that the first and second free pistons are provided within the flow rate control mechanism.

The present invention enables to provide a steering system, in which the set of the ratio of the steered angle of the wheel tire to the steering angle of the steering wheel can be changed depending on the driving situation without causing any sensation of discomfort to the driver.

DETAILED DESCRIPTION OF THE INVENTION

Embodiments of the present invention will be described below.

Embodiment 1

Figure 1:
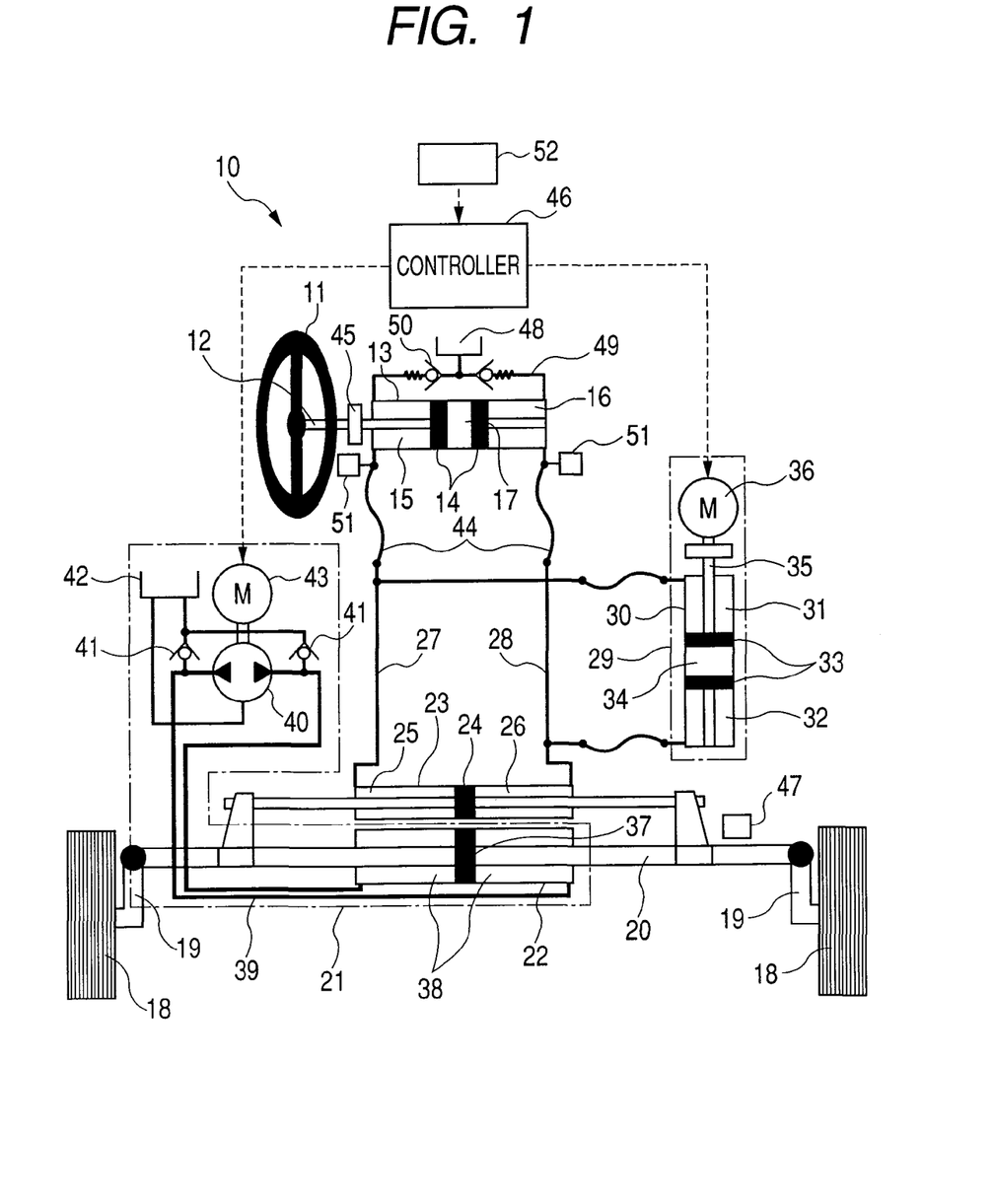
FIG. 1 illustrates an overall configuration of a steering system according to a first embodiment of the invention.

A preferred embodiment of the present invention will be described with reference to a first embodiment. FIG. 1 illustrates an overall configuration of a steering system 10 according to the present invention. In this figure, a reference numeral 11 represents a steering wheel, which is connected to an input cylinder 13 through an input shaft 12. A piston 14 fluid tightly defines first and second hydraulic chambers 15 and 16 in the input cylinder 13. A rotary motion of the steering wheel 11 is converted to a linear motion of the piston 14 by a transmission mechanism 17.

A steerable vehicle wheel 18 is connected to a steering axle 20 via a knuckle arm 19. The steering axle 20 is provided with: a power cylinder 22 serving as an output of a steering actuator 21; and an output cylinder 23 parallel thereto. A piston 24 connected to the steering axle 20 is provided in the output cylinder 23, and fluid tightly defines third and fourth hydraulic chambers 25 and 26. The first and second hydraulic chambers 15 and 16 of the input cylinder 13 are connected to the third and fourth hydraulic chambers 25 and 26 of the output cylinder 23 via first and second hydraulic passages 27 and 28, respectively. Further, an flow rate control mechanism 29 is connected to: a first hydraulic circuit including the first hydraulic chamber 15, third hydraulic chamber 25 and first hydraulic passage 27; and a second hydraulic circuit including the second hydraulic chamber 16, fourth hydraulic chamber 26 and second hydraulic passage 28, in which the hydraulic oils of the first and second hydraulic circuits are transferred in and out of the flow rate control mechanism 29 to adjust the ratio of hydraulic oil quantities flowing between the input cylinder 13 and output cylinder 23 through the first and second hydraulic circuits. Here, the flow rate control mechanism 29 has a cylinder 30 and a piston 33 for defining fifth and sixth hydraulic chambers 31 and 32 in the cylinder 30, and is connected to a motor 36 via a transmission gear 34 and an adjustment shaft 35.

Furthermore, a piston 37 connected to the steering axle 20 defines a pair of hydraulic chambers 38 in the power cylinder 22. The hydraulic chambers 38 are connected to a pump 40 via a steering actuator hydraulic passage 39, which is further connected to a reservoir tank 42 via check valves 41. The pump 40 is driven by a motor 43, and selectively delivers hydraulic oil to the hydraulic chambers 38 to provide the steering axle 20 with a steering power assistance.

In the steering system 10 having the above configuration, the steering wheel 11 and steerable vehicle wheel 18 are connected to each other via the first and second hydraulic circuits. During normal steering operation, the first and second hydraulic circuits function to transfer a steering power delivered by a driver to the steerable vehicle wheel 18 as well as transfer the reaction force of a road surface applied to the steerable vehicle wheel 18 to the steering wheel 11. In addition, as shown in FIG. 1, flexible tubing 44 such as a rubberized hose can also be used for a part of the first and second hydraulic passages 26 and 27 in order to freely dispose the hydraulic circuits.

During a steering operation, a sensor 45 such as a steering angle sensor and a torque sensor is used to detect a steering amount delivered by a driver, based on which a necessary steering assist power is calculated at a controller 46. Then, the motor 43 drives the pump 40 to control the pressure of the hydraulic chamber 38 in the power cylinder 22 according to the calculated assist power, thereby assisting the driver in steering a vehicle.

Furthermore, driving states such as speed, acceleration and yaw rate are read out using a vehicle sensor 52. If the controller 46 determines that it is preferable to a driver to change the transmission ratio of the steered angle of the steerable vehicle wheel 18 relative to the steering angle of the steering wheel 11, the flow rate control mechanism 29 and steering actuator 21 can be cooperatively controlled to alter the transmission ratio without causing any sensation of discomfort to the driver.

For example, in such a case where a vehicle is parked, providing a large steered angle of the steerable vehicle wheel 18 in response to a small steering angle of the steering wheel 11 will reduce the burden of the driver. In order to realize such a transmission ratio, the steering actuator 21 actuates the steerable vehicle wheel 18 by a greater-than-usual amount in response to a steering angle of the steering wheel 11. However, if the transmission ratio remains the same as usual, a greater-than-usual amount of hydraulic oil flows through the first and second hydraulic passages 27 and 28 because the pistons in the output cylinder 23 and power cylinder 22 moves together with each other, and consequently a great force is abruptly applied to the steering wheel 11, thereby giving the driver an unpleasant sensation. To overcome this, the flow rate control mechanism 29 is cooperatively controlled while the steering actuator 21 being controlled in order to keep unchanged the quantities of hydraulic oil flowing into the input cylinder 13 through the first and second hydraulic passages 27 and 28. For a specific example, consider a case where a driver is putting his vehicle in a garage and operates the steering wheel 11 in such a manner as to move the piston 14 of the input cylinder 13 to the right (looking at FIG. 1). In this case, the steering and vehicle states are read by the sensors 45 and 52 respectively, and if the controller 46 determines to change the transmission ratio based on the read states, it controls the steering actuator 21 to move the piston 37 of the power cylinder 22 to the left (looking at the figure) by such an amount that the steerable vehicle wheel 18 is steered by a larger-than-usual angle in response to the steering angle of the steering wheel 11. This increases the quantities of hydraulic oils flowing through the first and second hydraulic passages 27 and 28. However, the increased quantities of hydraulic oil can be determined from the control amount of the steering actuator 21, and then the piston 33 of the flow rate control mechanism 29 is moved downward by such an amount as to absorb the increased quantities of hydraulic oil thus determined. Thereby, the quantity of hydraulic oil flowing from each hydraulic passage into the input cylinder 13 can be kept unchanged. Thus, even if the ratio of the steered angle of the steerable vehicle wheel relative to the input angle of the steering wheel 11 becomes larger than usual, the driver has no sensation of discomfort.

It is also known that a smaller steered angle of the steerable vehicle wheel 18 relative to the steering angle of the steering wheel 11 will realize more stable running at high speed. In order to realize this, the steering actuator 21 is controlled so as to provide a less-than-usual transmission ratio of the steered amount of the steerable vehicle wheel 18 relative to the steering angle of the steering wheel 11. However, this operation causes a less-than-usual amount of hydraulic oil to flow through the first and second hydraulic passages 27 and 28 because the output cylinder 23 moves together with the power cylinder 22, thereby abruptly making the steering wheel feel heavier to the driver, which is in turn felt by the driver as a sensation of discomfort. To overcome this, similarly to the above case, the flow rate control mechanism 29 is cooperatively controlled while the steering actuator 44 being controlled in order to adjust the quantities of hydraulic oil flowing into the input cylinder 13 on the side of the steering wheel 11 through the first and second hydraulic passages 27 and 28 such that they remain unchanged. For a specific example, consider a case where a driver operates the steering wheel 11 when vehicle speed increases in such a manner as to move the piston 14 of the input cylinder 13 to the right in FIG. 1. In this case, the vehicle state is read by sensors, and the controller 46 controls the steering actuator 21 to move the piston 37 of the power cylinder 22 to the left (looking at the figure) by such an amount that the steerable vehicle wheel 18 is steered by a smaller-than-usual angle in response to the steering angle of the steering wheel 11. This decreases the quantity of hydraulic oil flowing through the first and second hydraulic passages 27 and 28 compared to that flowing out of the input cylinder 13. However, the decreased quantity of hydraulic oil can be determined from the control amount of the steering actuator 21, and then the piston 33 of the flow rate control mechanism 29 can be moved upward by such an amount as to compensate the decreased quantity thus determined. Thereby, the quantity of hydraulic oil flowing from the hydraulic passages into the input cylinder 13 can be kept unchanged.

Furthermore, this method can similarly be applied to the case where the vehicle state determines that it is more preferable to automatically actuate the steerable vehicle wheel 18 irrespective of the driver's operation. In this case, when the steering wheel 11 is not operated and the steering actuator 21 steers the steerable vehicle wheel 18, hydraulic oil is transferred through the hydraulic passage 27 and 28. However, the flow rate control mechanism 29 can be controlled so as to absorb the transferred quantity of hydraulic oil and thus cause no hydraulic oil to flow in and out of the input cylinder 13, thereby preventing any force from being applied to the steering wheel 11. Thus, the steerable vehicle wheel 18 can be controlled without causing any sensation of discomfort to the driver.

As shown in the figure of the present embodiment, the flow rate control mechanism 29 is a method using a hydraulic cylinder; so, the oil quantity flowing in and out of the flow rate control mechanism 29 can be known by detecting the position of the piston 33. Therefore, the oil quantity transferring through each hydraulic passage can also be easily known when changing the steering transmission ratio as described above, thereby enabling exact knowledge of the quantity difference between the oil flowing in and out of the first hydraulic chamber and that flowing in and out of the third hydraulic chamber. As a result, an exact control can be provided, thus facilitating realization of a control without causing any sensation of discomfort to a driver.

In addition, as will be described later, the transmission mechanism 17 of the input cylinder 13 can be so configured that the reverse transmission efficiency from the axial motion of the input cylinder 13 to the rotary motion of the steering wheel 11 is less than the forward transmission efficiency from the steering wheel 11 to the input cylinder 13. As a result, even if the cooperative control between the flow rate control mechanism 29 and steering actuator 21 fails to be timed, the failure is hardly transmitted to the steering wheel, thus preventing the driver from feeling a sensation of discomfort.

Furthermore, when the steering actuator 21 fails due to an electrical fault or the like, the abnormality is detected based on a variation in the control current to the motor 43 of the steering actuator 21 or sensor values, and the steering system is controlled so as to prevent the abnormality from disturbing the steering. Moreover, when a high steering power is required in such a case of steering a vehicle by a large angle, the flow rate control mechanism 29 is controlled to assist the steering.

When there occurs a displacement of correspondence between the neutral position of the steering wheel 11 and that of the steerable vehicle wheel 18 caused by a small amount of hydraulic oil leakage from the hydraulic circuits or the like, the displacement of correspondence is detected by comparison of the value of the steering angle sensor 45 with that of a stroke sensor 47. If there occurs a displacement of correspondence between the two neutral positions, the steering actuator 21 and flow rate control mechanism 29 can be cooperatively controlled to correct the displacement of correspondence between the neutral positions with the driver not noticing it. In addition, a displacement of the neutral position of the steerable vehicle wheel 18 may be detected by a sensor 52 for detecting vehicle state instead of the stroke sensor 43.

Further, there may be provided: a connecting hydraulic passage 49 for connecting the first and second hydraulic circuits to a reservoir tank 48; and one-way valves 50 for limiting hydraulic oil flow in one direction, so that if a small amount of hydraulic oil leaks from the hydraulic circuits, the reservoir tank replenishes the leaked hydraulic oil.

In addition, the operating torque applied to the steering wheel 11 may be detected by hydraulic pressure sensors 51 provided at the hydraulic circuits. Such a configuration enables detection of operating torques as well as faults in the hydraulic circuits, thus improving reliability.

Figure 2:
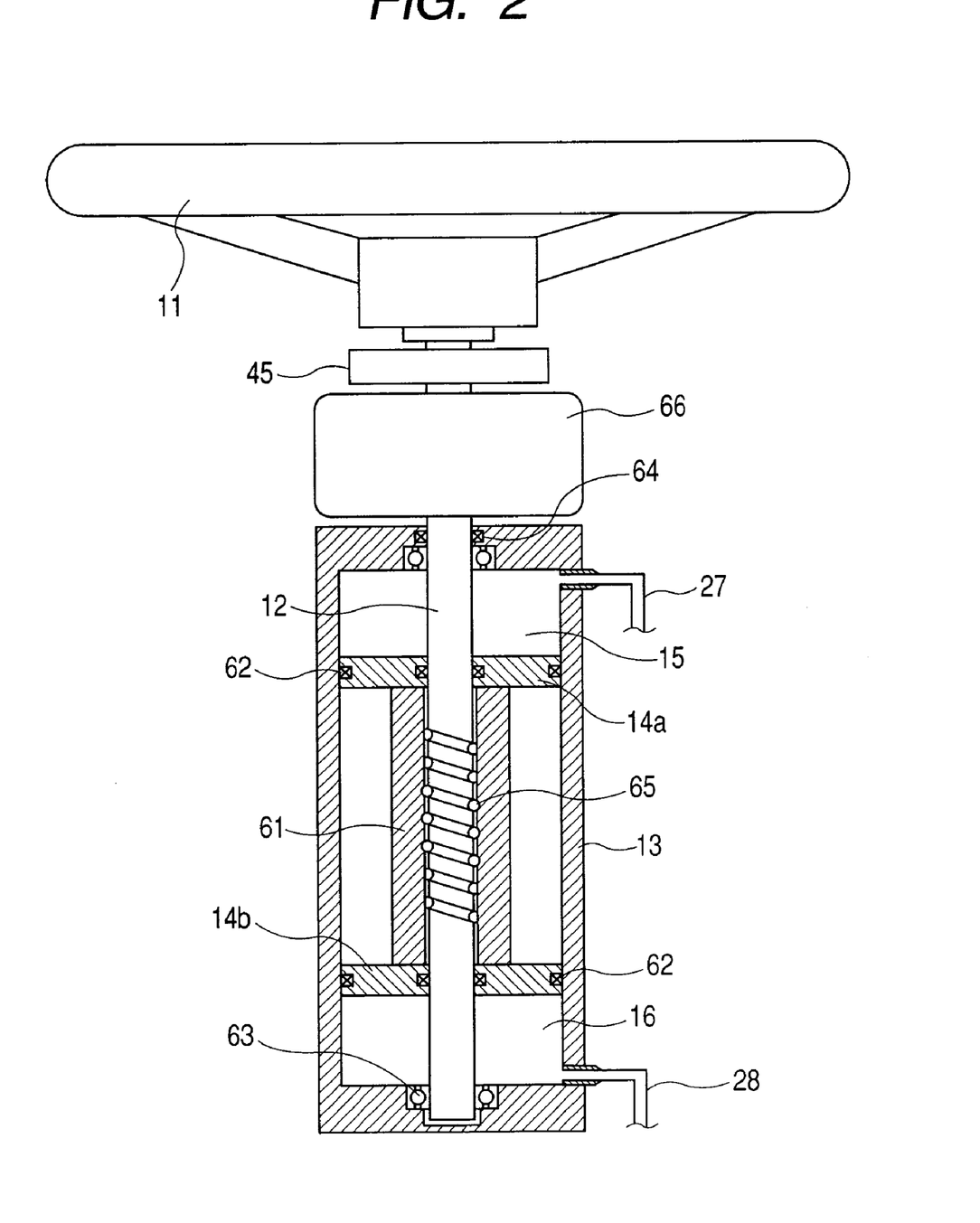
FIG. 2 is a cross sectional view of an input cylinder of a steering system according to a first embodiment of the invention.

Further, the input cylinder 13 used for the present embodiment has, for example, a configuration as shown in FIG. 2. As described above, the input cylinder 13 is connected to the steering wheel 11 via the input shaft 12. The piston 14 in the input cylinder 13 is configured with a pair of pistons 14a and 14b with a later-described ball nut 61 sandwiched therebetween. Along the outer periphery of the pistons 14a and 14b is provided a seal ring 62 for sealing the gap between itself and the input cylinder 13, while, similarly, along their inner peripheries is provided a seal ring 62 for sealing the gap between itself and the input shaft 12. Further, ball bearings 63 for rotatably supporting the input shaft 12 are provided between the input shaft 12 and input cylinder 13 at the top and bottom of the input cylinder 13. Furthermore, in order to secure fluid tightness of the input cylinder 13 through which the input shaft 12 penetrates, there are provided a seal ring 64 for sealing the gap between the input shaft 12 and input cylinder 13 while permitting the rotation of the input shaft 12.

At the ball nut 61 and input shaft 12 is formed a spiral groove, in which multiple balls 65 are placed to configure a ball screw mechanism. The ball screw mechanism is used to enable a rotation of the input shaft 12 to cause an axial motion of the piston 14 connected to the ball nut 61. In addition, a gear 66 with a predetermined increasing ratio may be inserted between the rotary shaft of the steering wheel 11 and the input shaft to provide a configuration for securing the stroke of the piston 14.

This configuration is used to change the volumes of the hydraulic chambers 15 and 16 of the input cylinder 13, thereby generating a hydraulic oil flow through each of the hydraulic passages 27 and 28. To put it the other way around, a hydraulic pressure generated by a force exerted on the steerable vehicle wheel 18 is transferred to the hydraulic chambers 15 and 16, and changes the pressure applied to the piston 14, which is in turn transferred to the steering wheel as a reaction force. Here, the groove shapes of the ball nut 61 and input shaft 12 and others are adjusted such that the transmission efficiency from the linear motion of the piston 14 to the rotary motion of the input shaft 12 is less than that from the rotary motion of the input shaft 12 to the linear motion of the piston 14. This configuration prevents the steering wheel from unintentionally turning by a great force caused by a pressure increase in the hydraulic chambers 15 and 16 of the input cylinder 13 in such a case where the steering actuator 21 fails and the flow rate control mechanism 29 erroneously attempts to assist the steering power. In addition, the shapes and sizes of the grooves, balls and the like may be adjusted such that the greater the pressure applied to the hydraulic chambers and therefore the greater the force exerted on the piston, the lower the transmission efficiency from the linear motion to the rotary motion becomes.

Figure 3:
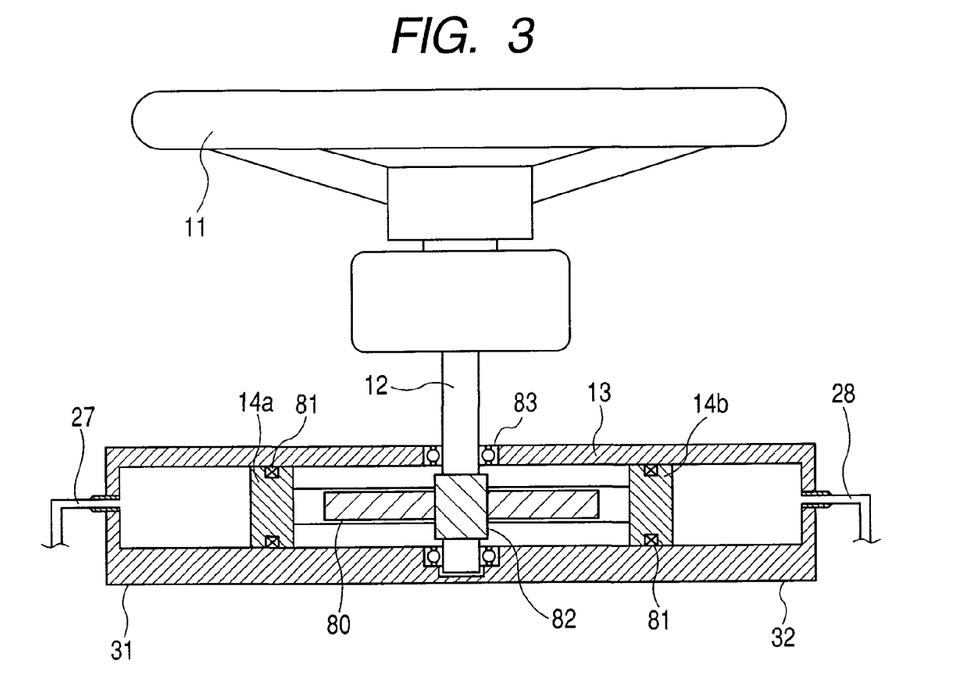
FIG. 3 is a cross sectional view of an alternative configuration of an input cylinder of a steering system according to a first embodiment of the invention.

The input cylinder 13 used for the present embodiment may have a configuration shown in FIG. 3 instead of the configuration of FIG. 2. The input cylinder 13 is connected to the steering wheel 11 via the input shaft 12 as shown in FIG. 3. In the input cylinder 13, the first and second hydraulic chambers 15 and 16 are defined by a pair of the pistons 14*a* and 14*b*, between which is sandwiched a rack bar 80 with a rack gear formed thereon. A seal ring 81 is fixed along the outer periphery of each piston to ensure fluid tightness of each hydraulic chamber. The rack gear on the rack bar 80 engages with a pinion gear 82 fitted on the input shaft 12 to provide conversion from rotary motion of the steering wheel 11 to axial motion of the rack bar 80. To put it the other way around, a change in the reaction force of a road surface applied to the steerable vehicle wheel 18 is transferred from the output cylinder 23 to the input cylinder 13 via each hydraulic passage, causing a change in the pressure applied to the piston 14, which is in turn transferred to the steering wheel 11 as a reaction force.

Figure 4:
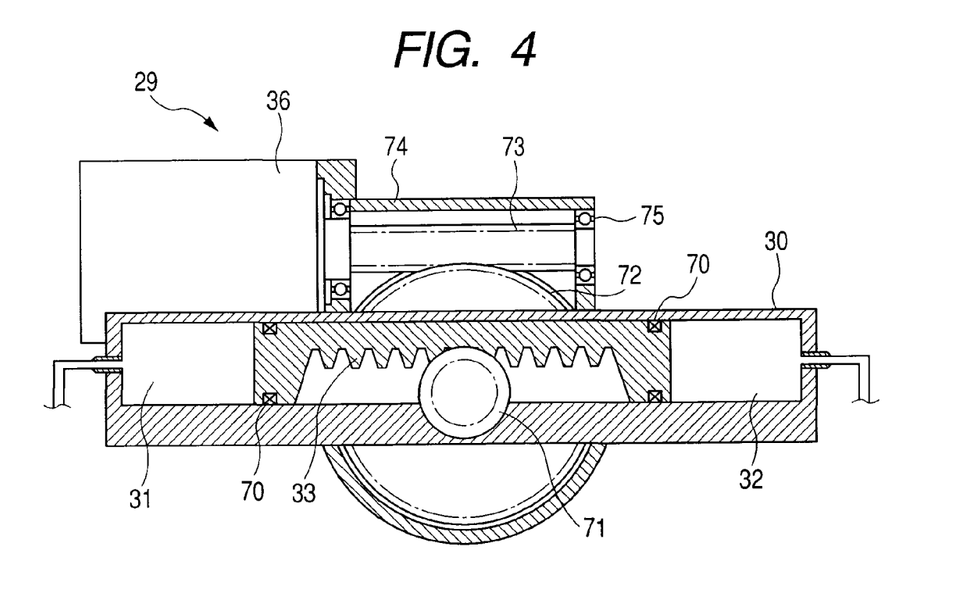
FIG. 4 is a cross sectional view of a flow rate control mechanism of a steering system according to a first embodiment of the invention.

Further, the flow rate control mechanism 29 used for the present embodiment has, for example, a configuration as shown in FIG. 4. In the cylinder 30, the piston 33 with a rack formed thereon defines a pair of hydraulic chambers. At either end of the piston 33 is fitted a seal ring 70, which seals the gap between the cylinder 30 and piston 33 to secure fluid tightness. On the piston 33 is formed a rack gear constituting a part of the transmission gear, and the rack gear engages with a pinion gear 71 also constituting a part of the transmission gear. In addition, a worm wheel 72 is provided coaxially with a pinion gear 71. Further, on the motor output shaft of the motor 36 is provided a worm 73, which is combined with the worm wheel 72 to constitute a worm gear mechanism. The motor output shaft is rotatably supported by ball bearings 75 provided in a housing 74. This configuration converts rotary motion of the motor 36 to linear motion of the piston 33, which can be utilized to adjust the hydraulic oil quantity flowing in and out of the fifth and sixth hydraulic chambers 31 and 32, and therefore adjust the hydraulic oil quantity ratio of the first and second hydraulic circuits. Further, since the worm gear mechanism is used, the motor output shaft experiences almost no rotation caused by an input from the worm wheel 72.

Figure 5:
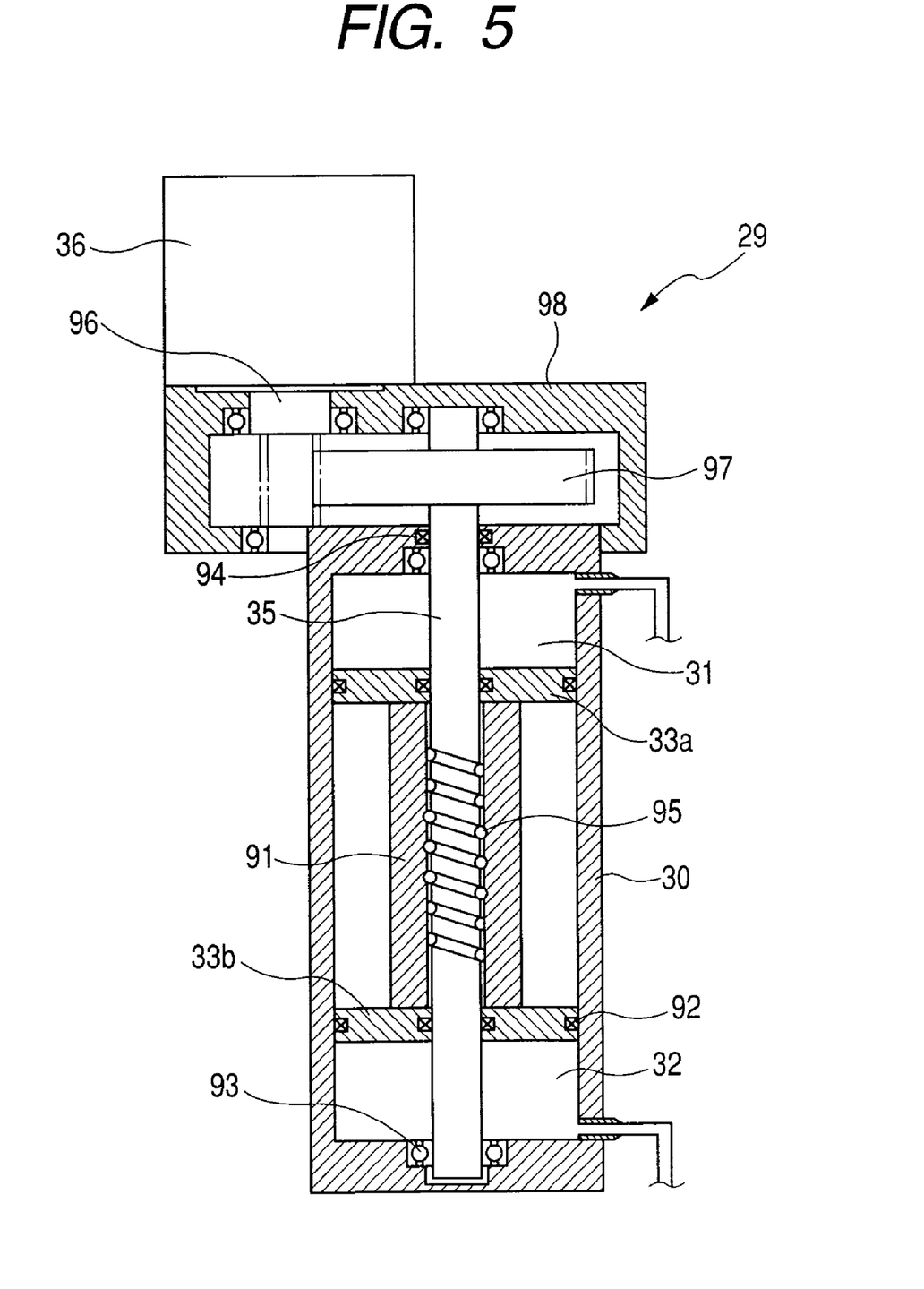
FIG. 5 is a cross sectional view of an alternative configuration of a flow rate control mechanism of a steering system according to a first embodiment of the invention.

Furthermore, the flow rate control mechanism 29 used for the present embodiment may have a configuration shown in FIG. 5 instead of the configuration of FIG. 4. The piston 33 in the cylinder 30 of the flow rate control mechanism 29 is configured with a pair of pistons 33*a* and 33*b* with a later-described ball nut 91 sandwiched there between. Along the outer periphery of the pistons 33*a* and 33*b* is provided a seal ring 92 for sealing the gap between itself and the cylinder 30, while, similarly, at their inner peripheries is provided a seal ring 92 for sealing the gap between itself and the adjustment shaft 35. Further, ball bearings 93 for rotatably supporting the adjustment shaft 35 are provided between the adjustment shaft 35 and cylinder 30 at the top and bottom of the cylinder 30. Furthermore, in order to secure fluid tightness of the cylinder 30 through which the adjustment shaft 35 penetrates, there are provided a seal ring 94 for sealing the gap between the adjustment shaft 35 and cylinder 30 while permitting the rotation of the adjustment shaft 35.

At the ball nut 91 and adjustment shaft 35 is formed a spiral groove, in which multiple balls 95 are placed to configure a ball screw mechanism. This ball screw mechanism is used to enable a rotation of the adjustment shaft 35 to cause a smooth axial motion of the piston 33 connected to the ball nut 91. Further, on a motor output shaft 96 of the motor 36 is provided a gear, which engages with a gear 97 provided at one end of the adjustment shaft 35. The motor output shaft 96 is rotatably supported by the ball bearings 93 fitted in a housing 98. This configuration converts a rotary motion of the motor 36 to a linear motion of the piston 33, which can be utilized to adjust the hydraulic oil quantities flowing in and out of the fifth and sixth hydraulic chambers 31 and 32, and therefore adjust the hydraulic oil quantity ratio of the first and second hydraulic circuits.

In addition, the flow rate control mechanism 29, which is connected to the steering wheel 11 via hydraulic lines, may be disposed sufficiently distant from the steering wheel 11 so that hydraulic damping can be utilized to prevent vibration caused by the operation of the flow rate control mechanism 29 from propagating to the steering wheel 11.

Although the output cylinder 23 is disposed parallel to the power cylinder 22 in the above-described configuration, the output cylinder 23 and power cylinder 22 may be serially disposed above the steering axle 20 when the vehicle width is sufficiently wide.

In addition, in the steering system 10 according to the present embodiment, the pumps, motors and other parts of the flow rate control mechanism 29 and steering actuator 21 may be disposed at the same place, thereby obtaining improved mountability.

Figure 6:
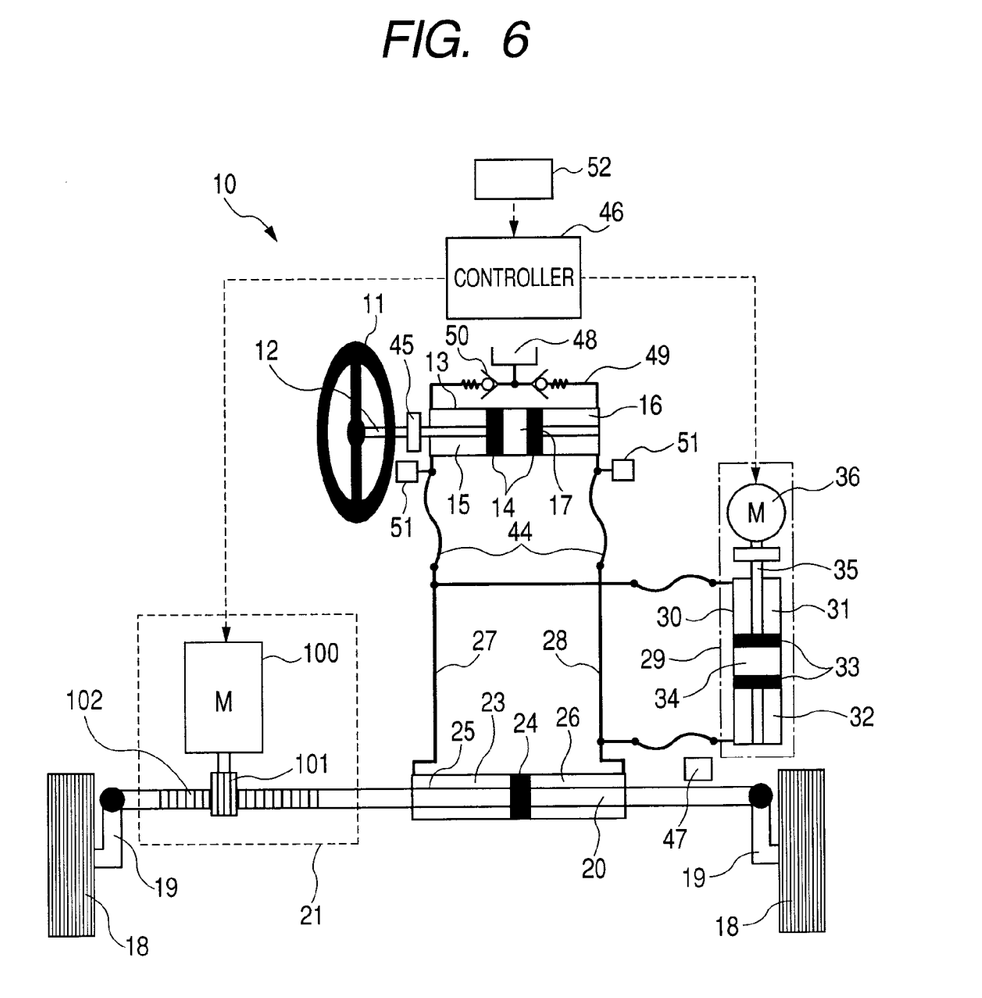
FIG. 6 is a schematic view of an alternative configuration of a steering system according to a first embodiment of the invention.

Although the steering system 10 of the present embodiment uses the power cylinder 22 for the steering actuator 21, it may alternatively use a motor driven steering actuator 21 which transmits rotation of the motor 100 via a pinion 101 and a rack gear 102 formed on the steering axle 20 as shown in FIG. 6, and yet can provide similar functions and effects by using control operations similar to those described above.

Embodiment 2

A second embodiment of the present invention will be described in detail with reference to FIGS. 7 to 9. Only the parts of the configuration different from the first embodiment will be described in the following. The parts of the configuration similar to those of the first embodiment are assigned the same reference numerals, and are not repeatedly described herein.

A steering system according to this embodiment includes the first and second hydraulic circuits described in the first embodiment and, in addition to these, third and fourth hydraulic circuits of a similar configuration to the first and second hydraulic circuits.

A steering wheel 11 is connected to a second input cylinder 213 via an input shaft 12. In the second input cylinder 213, a piston 214 fluid tightly defines ninth and tenth hydraulic chambers 215 and 216. A transmission mechanism 217 converts rotary motion of the steering wheel 11 to linear motion of the piston 214.

Further, a second output cylinder 223 is provided parallel to a steering axle 20. A piston 224 connected to the steering axle 20 is provided in the second output cylinder 223, and fluid tightly defines 11th and 12th hydraulic chambers 225 and 226. The ninth and tenth chambers 215 and 216 of the second input cylinder 213 are connected to the 11th and 12th hydraulic chambers 225 and 226 of the second output cylinder 223 via third and fourth hydraulic passages 227 and 228, respectively. Further, a second cylinder 230 of an flow rate control mechanism 29 is connected to: the third hydraulic circuit including the ninth hydraulic chamber 215, 11th hydraulic chamber 225 and third hydraulic passage 227; and the fourth hydraulic circuit including the tenth hydraulic chamber 216, 12th hydraulic chamber 226 and fourth hydraulic passage 228. With this configuration, the hydraulic oils of the third and fourth hydraulic circuits are transferred in and out of the flow rate control mechanism 29 to adjust the ratio of hydraulic oil quantities flowing between the second input cylinder 213 and second output cylinder 223 through the third and fourth hydraulic passages. Here, the second cylinder 230 of the flow rate control mechanism 29 has a piston 233 for defining seventh and eighth hydraulic chambers 231 and 232 in the cylinder 230, and is connected to a motor 36 via a transmission gear 234 and an adjustment shaft 35.

In the steering system 10 of the configuration described above, a piston 14 in the output cylinder 13 and the piston 214 in the output cylinder 213 move together with each other. Similarly, a piston 24 in an input cylinder 23 and the piston 224 in the input cylinder 223 move together with each other, while a piston 33 and the piston 233 of the flow rate control mechanism 29 move together with each other. Thus, the same quantity of hydraulic oil flows through the first and third hydraulic circuits in the same direction, while, similarly, the same quantity of hydraulic oil flows through the second and fourth hydraulic circuits in the same direction. As a result, even if one of the first/second hydraulic circuit or the third/fourth hydraulic circuit is damaged and fails, the other can continue the steering operation, thus providing a sufficiently reliable dual hydraulic circuit configuration for a steering system.

When performing a usual steering operation, when setting the steering transmission ratio and when correcting the neutral positions, each part is operated similarly to the first embodiment described above, and thereby similar functions and effects can be obtained even for such a dual hydraulic circuit.

Figure 8:
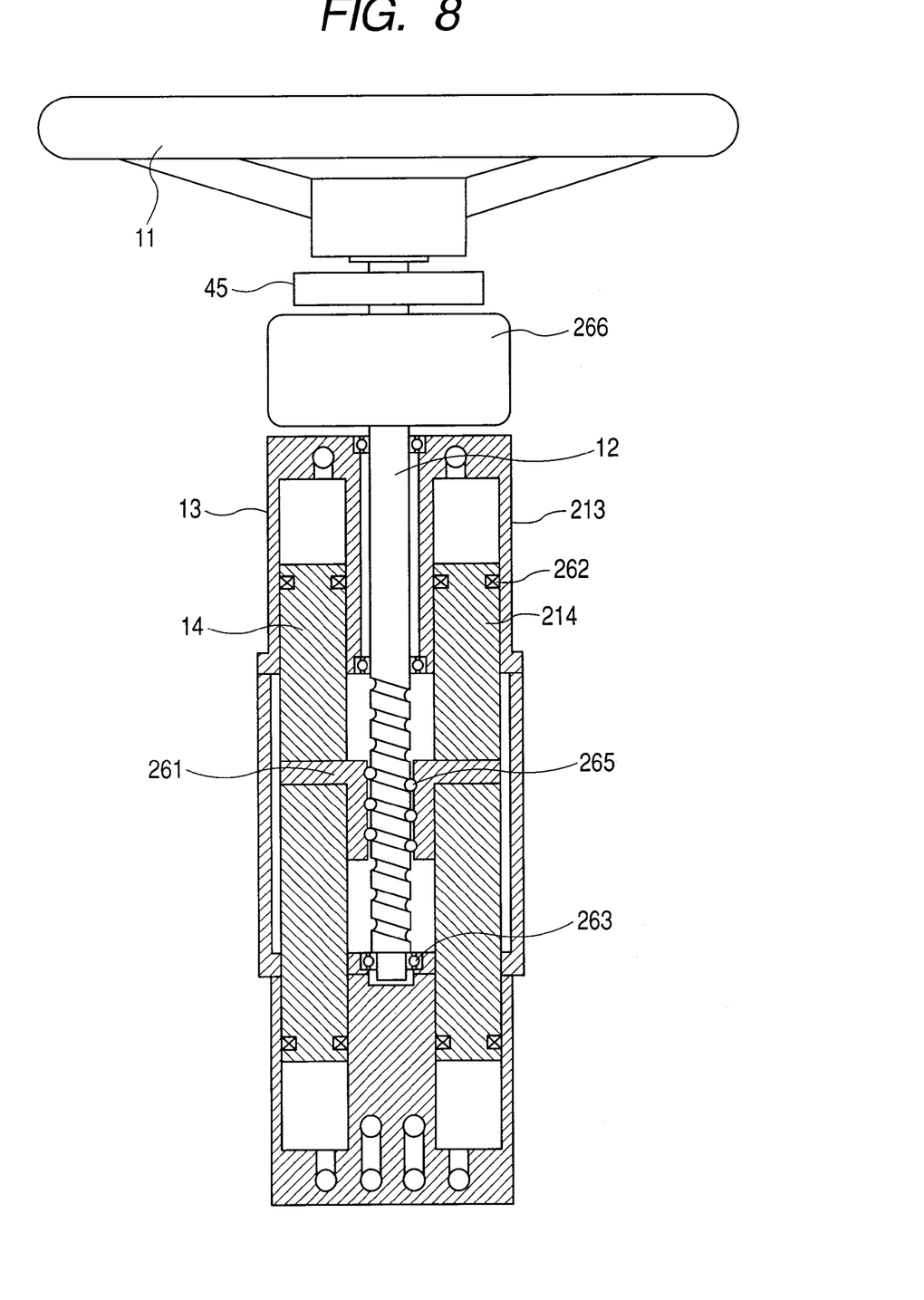
FIG. 8 is a cross sectional view of an input cylinder of a steering system according to a second embodiment of the invention.

In addition, an input cylinder unit used in the present embodiment has a configuration as schematically shown in FIG. 8, thereby providing the above-described effects. As described above, the input cylinders 13 and 213 are connected to the steering wheel 11 via the input shaft 12. The pistons 14 and 214, which define four separate hydraulic chambers in the input cylinders 13 and 213, are fixed to a later-described ball nut 261. At either end and along the outer periphery of the pistons 14 and 214 is provided a seal ring 262 for sealing the gaps between the pistons 14 and 214 and the input cylinders 13 and 213 respectively.

At the ball nut 261 and input shaft 12 is formed a spiral groove, in which multiple balls 265 are placed to configure a ball screw mechanism. This ball screw mechanism enables a rotation of the input shaft 12 to cause an axial motion of the pistons 14 and 214 connected to the ball nut 61. Further, the input shaft 12 is rotatably fixed to the housing of the input cylinders 13 and 213 by ball bearings 263. In addition, a gear 266 with a predetermined increasing ratio may be inserted between the rotary shaft of the steering wheel 11 and the input shaft to provide a configuration for securing the stroke of the pistons 14 and 214.

This configuration changes the volume of each hydraulic chamber of the input cylinders 13 and 213, which in turn generates a hydraulic oil flow in each hydraulic passage. To put it the other way around, a hydraulic pressure generated by a force exerted on a steerable vehicle wheel 18 is transferred to each hydraulic chamber, and changes the pressure applied to the pistons 14 and 214, which is in turn transferred to the steering wheel as a reaction force.

Similarly to the case of the input cylinder 13 of FIG. 2, the groove shapes of the ball nut 261 and input shaft 12 are adjusted such that the transmission efficiency from the linear motion of the pistons 14 and 214 to the rotary motion of the input shaft 12 is less than that from the rotary motion of the input shaft 12 to the linear motion of the pistons 14 and 214. In addition to this, the shapes of the grooves, balls and other parts may be adjusted such that the greater the cylinder pressure and therefore the greater the force exerted on the pistons 14 and 214, the lower the transmission efficiency becomes. This configuration prevents the steering wheel from unintentionally turning by a great force in such a case where the steering actuator 21 fails and the flow rate control mechanism 29 erroneously attempts to assist the steering power.

Figure 9:
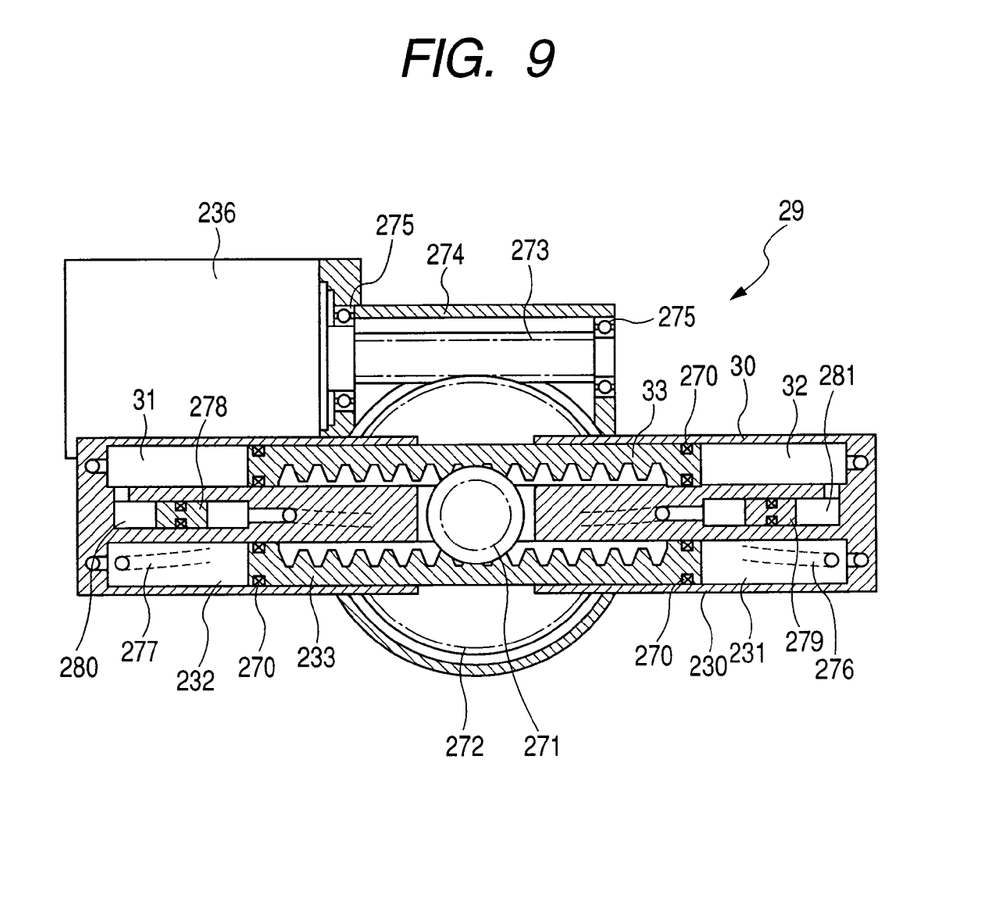
FIG. 9 is a cross sectional view of a flow rate control mechanism of a steering system according to a second embodiment of the invention.

In addition, the flow rate control mechanism 29 used in the present embodiment has a configuration as shown in FIG. 9 to provide the effect described above. The pistons 33 and 233 with a rack gear formed thereon defines a pair of hydraulic chambers in the cylinders 30 and 230, respectively. At either end of the pistons 33 and 233 is fitted a seal ring 270 for sealing the gaps between the cylinders 30 and 230 and pistons 33 and 233 respectively to secure fluid tightness. A pinion gear 271 engages with the rack gears on the pistons 30 and 230 such that it is sandwiched therebetween. Further, a worm wheel 272 is provided coaxially with the pinion gear 271. Further, on the motor output shaft of a motor 236 is provided a worm 273, which is combined with the worm wheel 272 to constitute a worm gear mechanism. In addition, the motor output shaft is rotatably supported by ball bearings 275 provided in a housing 274. This configuration converts rotary motion of the motor 236 to linear motion of the pistons 33 and 233, which can be utilized to adjust the hydraulic oil quantities flowing in and out of the fifth and sixth hydraulic chambers 31 and 32 as well as the oil quantities of the seventh and eighth hydraulic chambers 231 and 232, and therefore adjust the hydraulic oil quantity ratio of the first and second hydraulic circuits as well as the hydraulic oil quantity ratio of the third and fourth hydraulic circuits.

Furthermore, in the flow rate control mechanism 29 are provided: a balancing hydraulic passage 276 for connecting the fifth hydraulic chamber to the seventh hydraulic chamber; and a balancing hydraulic passage 277 for connecting the sixth hydraulic chamber to the eighth hydraulic chamber, and somewhere in the balancing hydraulic passages 276 and 277 are respectively formed cylinders 280 and 281 having free pistons 278 and 279. Along the outer periphery of the free pistons 278 and 279 is fitted a seal ring for sealing the gap between the cylinders 280 and 281, thus preventing mixing of the hydraulic oils of the fifth and seventh hydraulic chambers as well as the sixth and eighth hydraulic chambers. With this configuration, when there occurs an oil leakage in one of the first and third hydraulic circuits or the second and fourth hydraulic circuits which apply a force to the steerable vehicle wheel 18 in the same direction, the free piston 278 or 279 moves to the side of the hydraulic circuit in which hydraulic oil is lacking, thus enabling oil supply balancing between the hydraulic circuits. As a result, the dual hydraulic circuit system can transfer the same force in the same direction.

Figure 7:
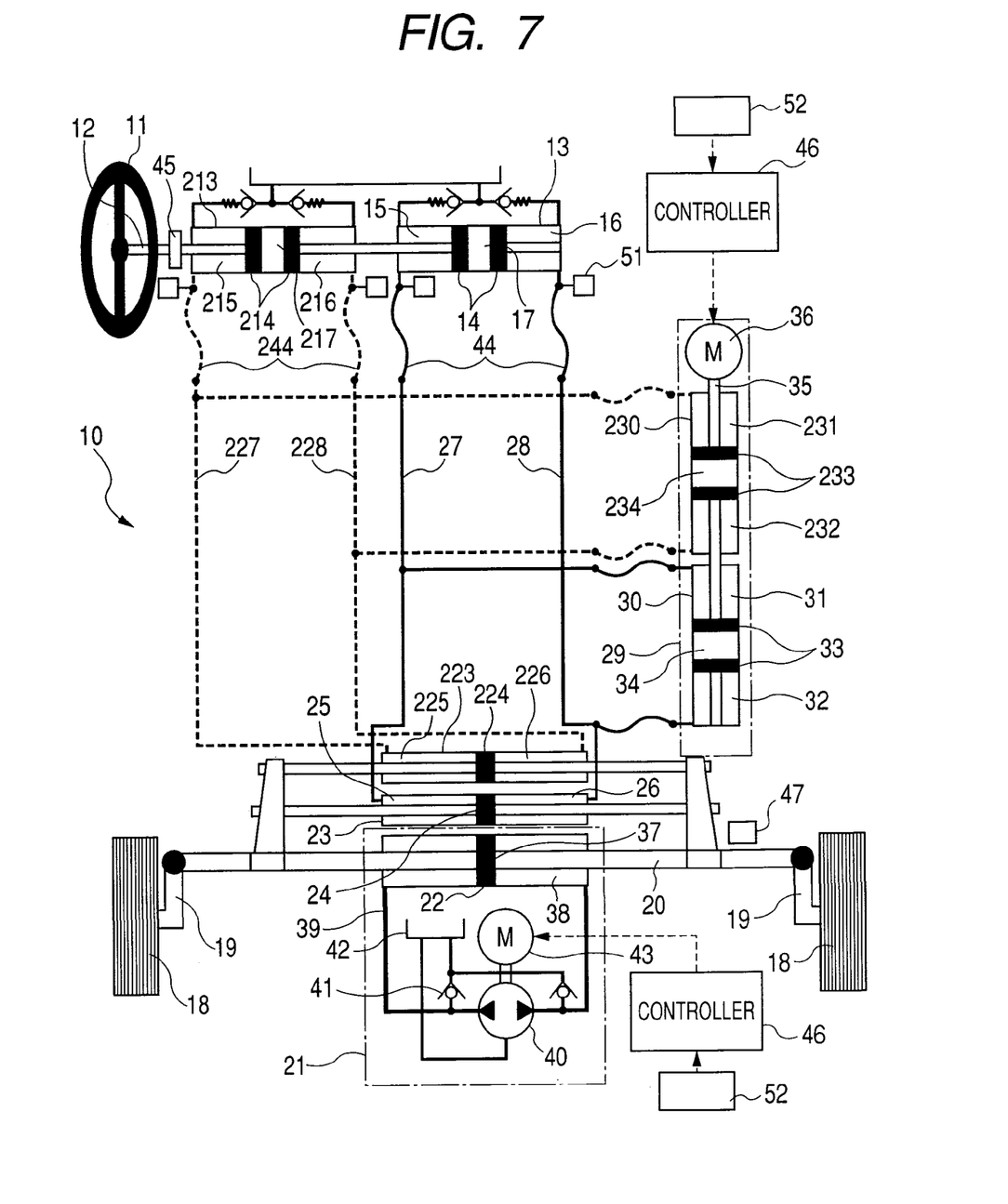
FIG. 7 illustrates an overall configuration of a steering system according to a second embodiment of the invention.

While, in the present embodiment which ensures a high reliability using the dual hydraulic circuit, the steering actuator 21 is configured with a power cylinder 22 and a pump 40 shown in FIG. 7, it may alternatively use, with similar functions and effects, a motor 100, a pinion 101 and a rack 102 similarly to the steering actuator 21 of the first embodiment as shown in FIG. 6.

What is claimed is:

1. A steering system comprising:
   an input cylinder having a first hydraulic chamber and a second hydraulic chamber;
   a transmission mechanism, wherein a transmission efficiency for converting and transmitting a linear motion of the input cylinder to a rotary motion of a steering wheel is less than a transmission efficiency for converting and transmitting the rotary motion of the steering wheel to the linear motion of the input cylinder;
   an output cylinder connected to a steerable vehicle wheel and having a third hydraulic chamber and a fourth hydraulic chamber;
   a first hydraulic passage for connecting the first hydraulic chamber to the third hydraulic chamber;
   a second hydraulic passage for connecting the second hydraulic chamber to the fourth hydraulic chamber;
   a first hydraulic circuit including the first hydraulic chamber, third hydraulic chamber, and first hydraulic passage;
   a second hydraulic circuit including the second hydraulic chamber, fourth hydraulic chamber, and second hydraulic passage;
   a flow rate control mechanism for adjusting the ratio of the hydraulic oil quantities in the first hydraulic circuit and the second hydraulic circuit that flow between the first hydraulic chamber and the third hydraulic chamber through the first hydraulic passage, and flowing between the second hydraulic chamber and the fourth hydraulic chamber through the second hydraulic passage in order to keep unchanged the quantities of hydraulic oil in the first hydraulic circuit and the second hydraulic circuit;
   a steering actuator for providing the steerable vehicle wheel with a steering power assistance; and
   a controller for cooperatively controlling the flow rate control mechanism and the steering actuator;
   wherein the flow rate control mechanism comprises:
   a cylinder tube;
   a piston for defining, in the cylinder tube, a fifth hydraulic chamber connected to the first hydraulic circuit and a sixth hydraulic chamber connected to the second hydraulic circuit;
   an electric motor; and
   a conversion gear for converting a rotary motion of the electric motor to an axial motion of the piston, the conversion gear having irreversibility for suppressing power transmission from the piston to the electric motor.

2. The steering system according to claim 1, wherein when a displacement of correspondence between the neutral position of the steering wheel and that of the steerable vehicle wheel occurs, the flow rate control mechanism cooperates with the steering actuator to correct the displacement of correspondence.

3. The steering system according to claim 2, further comprising:
   a steering angle sensor for detecting a steering angle of the steering wheel; and
   a steered angle sensor for detecting a steered angle of the steerable vehicle wheel,
   wherein the flow rate control mechanism corrects the displacement of correspondence between the neutral positions based on sensor outputs of the steering angle sensor and the steered angle sensor.

4. The steering system according to claim 1, the steering actuator comprising:
   a power cylinder connected to the steerable vehicle wheel and having a pair of hydraulic chambers; and
   a reversible pump reversibly driven by an electric motor for selectively supplying the power cylinder with a hydraulic pressure.

5. The steering system according to claim 4, wherein the output cylinder and the power cylinder are disposed parallel to each other.

6. The steering system according to claim 1, further comprising:
   a reservoir tank;
   a first connecting passage for connecting the first hydraulic circuit to the reservoir tank;
   a first one-way valve provided in the first connecting passage for permitting only an oil flow from the reservoir tank to the first hydraulic circuit;
   a second connecting passage for connecting the second hydraulic circuit to the reservoir tank; and
   a second one-way valve provided in the second connecting passage for permitting only an oil flow from the reservoir tank to the second hydraulic circuit.

7. The steering system according to claim 1, further comprising a hydraulic pressure sensor for detecting hydraulic pressures of the first and second hydraulic chambers, respectively, wherein the controller controls the steering actuator based on a sensor output of the hydraulic pressure sensor.

8. The steering system according to claim 7, wherein the controller detects abnormalities of the first and second hydraulic circuits based on a sensor output of the hydraulic pressure sensor.

9. The steering system according to claim 1, wherein the transmission mechanism is configured such that the greater the pressure of the first or second hydraulic chamber, the lower the transmission efficiency from the input cylinder to the steering wheel.

* * * * *